United States Patent
Sugii et al.

(10) Patent No.: US 8,064,614 B2
(45) Date of Patent: Nov. 22, 2011

(54) AUDIO SIGNAL DELIVERY MANAGEMENT SYSTEM, AUDIO SIGNAL ACQUIRING AND TRANSMITTING APPARATUS, AUDIO SIGNAL IDENTIFYING AND OUTPUTTING APPARATUS, AND AUDIO SIGNAL DELIVERING APPARATUS

(75) Inventors: Kiyohisa Sugii, Meguro-ku (JP); Youji Semba, Iwata (JP)

(73) Assignee: Yamaha Corporation, Hamamatsu-shi (JP)

( * ) Notice: Subject to any disclaimer, the term of this patent is extended or adjusted under 35 U.S.C. 154(b) by 908 days.

(21) Appl. No.: 12/057,732

(22) Filed: Mar. 28, 2008

(65) Prior Publication Data

US 2008/0240460 A1    Oct. 2, 2008

(30) Foreign Application Priority Data

Mar. 29, 2007    (JP) .................................. 2007-087408

(51) Int. Cl.
*H04B 3/00* (2006.01)
*H04B 5/00* (2006.01)
*H04B 1/00* (2006.01)

(52) U.S. Cl. ................ 381/80; 381/58; 381/77; 381/81; 381/85; 381/86; 381/97; 700/94

(58) Field of Classification Search .................. 381/58, 381/77, 80, 81, 85, 86, 96, 97; 700/94
See application file for complete search history.

(56) References Cited

U.S. PATENT DOCUMENTS

| | | | | |
|---|---|---|---|---|
| 2001/0022842 A1* | 9/2001 | Fujii | ............................... | 381/97 |
| 2004/0249490 A1* | 12/2004 | Sakai | ............................... | 700/94 |
| 2007/0140506 A1* | 6/2007 | Roeck et al. | ..................... | 381/77 |
| 2007/0166003 A1* | 7/2007 | Herz et al. | ....................... | 386/83 |
| 2009/0005893 A1* | 1/2009 | Sugii et al. | ...................... | 700/94 |
| 2011/0069844 A1* | 3/2011 | Krampf et al. | .................. | 381/58 |

FOREIGN PATENT DOCUMENTS

JP    9-247106 A    9/1997
JP    2005-209084 A    8/2005

* cited by examiner

*Primary Examiner* — Dao H Nguyen
(74) *Attorney, Agent, or Firm* — Crowell & Moring LLP

(57) ABSTRACT

An audio signal delivery management system includes a management apparatus and an delivering apparatus which delivers an audio signal to a plurality of speaker devices to which respective addresses are assigned. The delivering apparatus include an address storing portion which stores the addresses of the speaker devices, an audio signal acquiring portion which acquires an audio signal, an audio signal delivering portion which delivers the audio signal to at least one of the speaker devices using the addresses, and a sending portion which sends the audio signal to the management apparatus. The management apparatus includes a receiving portion which receives the audio signal from the audio signal delivering apparatus, an identifying portion which analyzes the audio signal, collates an analysis result of the audio signal with audio signal analysis information of respective tunes, and identifies a tune represented by the audio signal based on a collation result, and an output portion which outputs identification information.

13 Claims, 6 Drawing Sheets

FIG. 6

| IP ADDRESS | USED TUNES |
|---|---|
| 123.456.789 | TUNE 01, TUNE 02, ··· |
| ⋮ | ⋮ |

FIG. 7

| TUNE ID | USE FEE |
|---|---|
| TUNE 01 | ××YEN |
| TUNE 02 | ○○YEN |
| ⋮ | ⋮ |

| SPEAKER IP ADDRESS | CHANNEL TYPE |
|---|---|
| 123.456.789 | CENTER SPEAKER CHANNEL |
| ***** | FRONT SPEAKER (L) CHANNEL |
| ⋮ | ⋮ |

AUDIO SIGNAL DELIVERY MANAGEMENT SYSTEM, AUDIO SIGNAL ACQUIRING AND TRANSMITTING APPARATUS, AUDIO SIGNAL IDENTIFYING AND OUTPUTTING APPARATUS, AND AUDIO SIGNAL DELIVERING APPARATUS

BACKGROUND

The present invention relates to a technique of delivering an audio signal.

In stores such as restaurants and boutiques, it is a general procedure to play background music (hereinafter abbreviated as BGM) using cable broadcast. However, to use cable broadcast for reproduction of BGM, it takes considerable time, labor, and cost to install cable broadcast receiving equipment. It is therefore difficult to introduce such equipment. Furthermore, in cable broadcast, a playing schedule of music (i.e., when to play what tunes) is entirely left to the broadcasting station side and hence it is difficult to play BGM according to a user's tastes.

In view of the above, Patent document 1 proposes a BGM terminal apparatus capable of playing BGM according to a program written by a user itself rather than a program written by the broadcasting station: side as in the case of cable broadcast. This apparatus makes it possible to play BGM according to a program written by a user itself.

However, with the technique of Patent document 1, it is necessary for a user to, for example, add up and pay use fees of individual tunes which are composed works. This is complicated work. As for the adding-up of use fees of tunes, Patent document 2 proposes a system in which to reduce the time and labor taken to record use results of composed works and make a report relating to their uses, logs of composed works reproduced by a reproducing apparatus are collated with a database by using ISRC (International Standard Recording Code) codes, POS codes, or the like and pieces of use results information of reproduced composed works are thereby collected.

[Patent document 1] JP-A-9-247105
[Patent document 2] JP-A-2005-209084

However, in the technique of Patent document 2, composed works are collated by referring to codes (information) recorded on a CD (compact disc) such as ISRC codes or POS codes. Therefore, tunes that are assigned no such codes cannot be collated. After all, an operator is required to input pieces of identification information of composed works. This is complicated work.

SUMMARY

The present invention has been made in view of the above circumstances, and an object of the invention is therefore to provide a technique that makes it possible to collect and manage use results of composed works without causing an operator to do complicated work.

In order to achieve the above object, according to the present invention, there is provided an audio signal delivery management system, comprising:
a management apparatus; and
an audio signal delivering apparatus which delivers an audio signal to a plurality of speaker devices to which respective addresses are assigned, the audio signal delivering apparatus being connected to the management apparatus so as to communicate with each other,
wherein the audio signal delivering apparatus include:
an address storing portion which stores the addresses of the speaker devices;
an audio signal acquiring portion which acquires an audio signal;
an audio signal delivering portion which delivers the audio signal to at least one of the speaker devices using the addresses stored in the address storing portion; and
an audio signal sending portion which sends the audio signal to the management apparatus: and
wherein the management apparatus includes:
an audio signal receiving portion which receives the audio signal from the audio signal delivering apparatus;
an audio signal identifying portion which analyzes the audio signal received by the audio signal receiving portion, collates an analysis result of the audio signal with audio signal analysis information of respective tunes which are stored in a storing portion, and identifies a tune represented by the audio signal on the basis of a collation result; and
an identification information output portion which outputs identification information indicating an identification result of the audio signal identifying portion.

According to the present invention, there is also provided an audio signal acquiring and transmitting apparatus, comprising:
a storing portion which stores terminal identification information;
an audio signal acquiring portion which acquires an audio signal; and
a sending portion which sends both of the terminal identification information and the acquired audio signal to an adding-up and management apparatus which adds up to determine the numbers of times of acquisition of tunes in terminals by identifying a tune on the basis of the received audio signal and collecting the terminal identification information and the identified tune.

According to the present invention, there is also provided an audio signal identifying and outputting apparatus, comprising:
a storing portion which stores terminal identification information;
an audio signal acquiring portion which acquires an audio signal;
an audio signal identifying portion which analyzes the acquired audio signal, collates an analysis result of the audio signal with audio signal analysis information of respective tunes which are stored in a storing portion, and identifies a tune represented by the audio signal on the basis of a collation result; and
an identification information output portion which outputs identification information indicating an identification result of the audio signal identifying portion together with the terminal identification information.

According to the present invention, there is also provided an audio signal delivering apparatus, comprising:
a device identification information storing portion which stores identification information for identifying respective speaker devices;
an audio signal acquiring portion which acquires an audio signal;
a sending portion which sends both of the device identification information and the acquired audio signal to an adding-up and management apparatus which adds up to determine the numbers of times of acquisition of tunes in the speaker devices by identifying a tune on the basis of the received audio signal and collecting the terminal identification information and the identified tune; and an audio signal delivering portion which delivers the audio signal to the speaker devices.

According to the present invention, there is also provided an audio signal delivering apparatus, comprising:

a device identification information storing portion which stores device identification information for identifying respective speaker devices;

an audio signal acquiring portion which acquires an audio signal;

an audio signal identifying portion which analyzes the acquired audio signal, collates an analysis result of the audio signal with audio signal analysis information of respective tunes which are stored in a storing portion, and identifies a tune represented by the audio signal on the basis of a collation result;

an identification information output portion which outputs identification information indicating an Identification result of the audio signal identifying portion together with the terminal identification information; and an audio signal delivering portion which delivers the audio signal acquired by the audio signal acquiring portion to the speaker devices.

Preferably, the audio signal delivering apparatus further comprises:

a use fee calculating portion which calculates a use fee of the audio signal on the basis of the identification information indicating the identification result of the audio signal identifying portion; and a use fee information output portion which outputs use fee information indicating the use fee calculated by the use fee calculating portion.

Preferably, The audio signal delivering apparatus further comprises:

a corresponding relationship storing portion which stores a corresponding relationship between the identification information and use fees of audio signals; and a use fee calculation judging portion which judges whether to calculate the use fee of the audio signal delivered by the audio signal delivering portion on the basis of the corresponding relationship stored in the corresponding relationship storing portion, wherein the use fee calculating portion calculates the use fee of the audio signal by referring to the corresponding relationship stored in the corresponding relationship storing portion if the use fee calculation judging portion judges that the use fee should be calculated, and does not calculate the use fee if the use fee calculation judging portion judges that the use fee need not be calculated.

Preferably, the audio signal delivering apparatus further comprises:

an adding-up portion which adds up to determine the numbers of times of delivery by the audio signal delivering portion on an audio-signal-by-audio-signal basis; and a number-of-times information output portion which outputs number-of-times information indicating the numbers of times determined by the adding-up portion.

Preferably, the audio signal delivering apparatus further comprises:

an address correspondence storing portion which stores identification information for identifying audio signals and addresses of predetermined apparatuses so as to be correlated with each other, wherein the number-of-times information output portion sends the number-of-times to the addresses corresponding to the respective audio signals.

Preferably, the audio signal delivering apparatus further comprises:

a settlement processing portion which performs settlement processing on the basis of the use fee calculated by the use fee calculating portion.

Preferably, the use fee calculating portion calculates, on an audio-signal-by-audio-signal basis, use fees of audio signals on the basis of the identification information generated by the audio signal identifying portion.

Preferably, the audio signal delivering apparatus further comprises:

a channel type storing portion which stores a corresponding relationship between addresses of the respective speaker devices and types of channels of the audio signal, wherein the audio signal acquiring portion acquires the audio signal having one or plural channels;

wherein the audio signal delivering portion delivers the audio signal having the channel type to the corresponding speaker devices on the basis of the corresponding relationship stored in the channel type storing portion; and wherein the use fee calculating portion calculates, on a speaker-group-by-speaker-group basis, the use fees of the audio signals on the basis of the identification information generated by the audio signal identifying portion, speaker devices to which the audio signal having one or plural channels is to be delivered constituting a speaker group.

The invention makes it possible to collect and manage use results of composed works without causing an operator to do complicated work.

BRIEF DESCRIPTION OF THE DRAWINGS

The above objects and advantages of the present invention will become more apparent by describing in detail preferred exemplary embodiments thereof with reference to the accompanying drawings, wherein:

FIG. 6 shows an example of details of data stored in a management information storing area 421:

FIG. 7 shows an example of details of data stored in a use fee data storing area 422:

DETAILED DESCRIPTION OF EXEMPLARY EMBODIMENTS

<A: Configuration of Embodiment>
<A-1: System Configuration>

Figure 1:
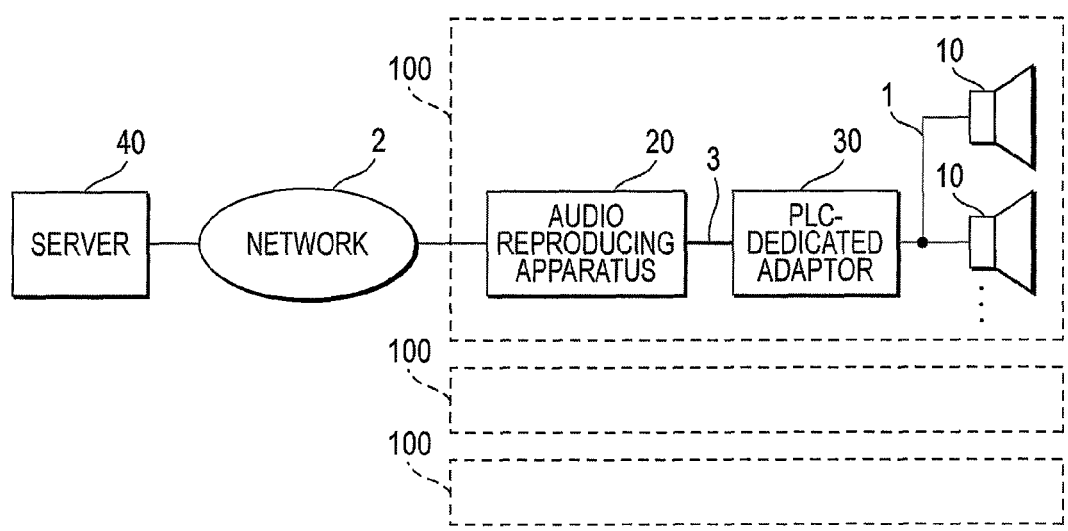
FIG. 1 is a block diagram showing an exemplary system configuration.

First, an audio signal delivery management system according to the present invention will be described with reference to FIG. 1. In FIG. 1 stores 100, which are restaurants, boutiques, etc., are set up throughout the country. Each store 100 is equipped with speaker devices 10, an audio reproducing apparatus 20, and a PLC-dedicated adaptor 30. To prevent FIG. 1 from being made unduly complex, FIG. 1 is drawn in such a manner that the speaker devices 10, the audio reproducing apparatus 20, and the PLC-dedicated adaptor 30 are shown in only one store 100, the other stores 100 are likewise equipped with them.

The PLC-dedicated adaptor 30 and the speaker devices 10 are connected to each other by power lines 1. The speaker devices 10 are devices having a function of emitting a sound according to an audio signal supplied. The PLC-dedicated adaptor 30 is an adaptor for sending data via the power lines 1 according to the PLC (power line communications) scheme. The audio reproducing apparatus 20 and the PLC-dedicated adaptor 30 are connected to each other via a network 3 such as the Internet or a dedicated line in such a manner that they can communicate with each other. The audio reproducing apparatus 20 supplies an audio signal to each speaker devices 10 via the network 3, the PLC-dedicated adaptor 30, and the power line 1. The PLC-dedicated adaptor 30 sends an audio signal (supplied form the audio reproducing apparatus 20) to each speaker device 10 via the power line 1 by superimposing the audio signal on commercial power. Furthermore, the PLC-dedicated adaptor 30 extracts a power-superimposed signal that is sent over the power lines 1 and sends the extracted signal to the audio reproducing apparatus 20 over the network 3. The PLC-dedicated adaptor 30 may be incorporated in the audio reproducing apparatus 20.

A server 40 is an apparatus for managing use results of tunes which are composed works and calculating fees for their uses. As shown in FIG. 1, the server 40 and the audio reproducing apparatus 20 are connected to each other via a network 2 such as the Internet or a dedicated line in such a manner that they can communicate with each other.

Figure 2:
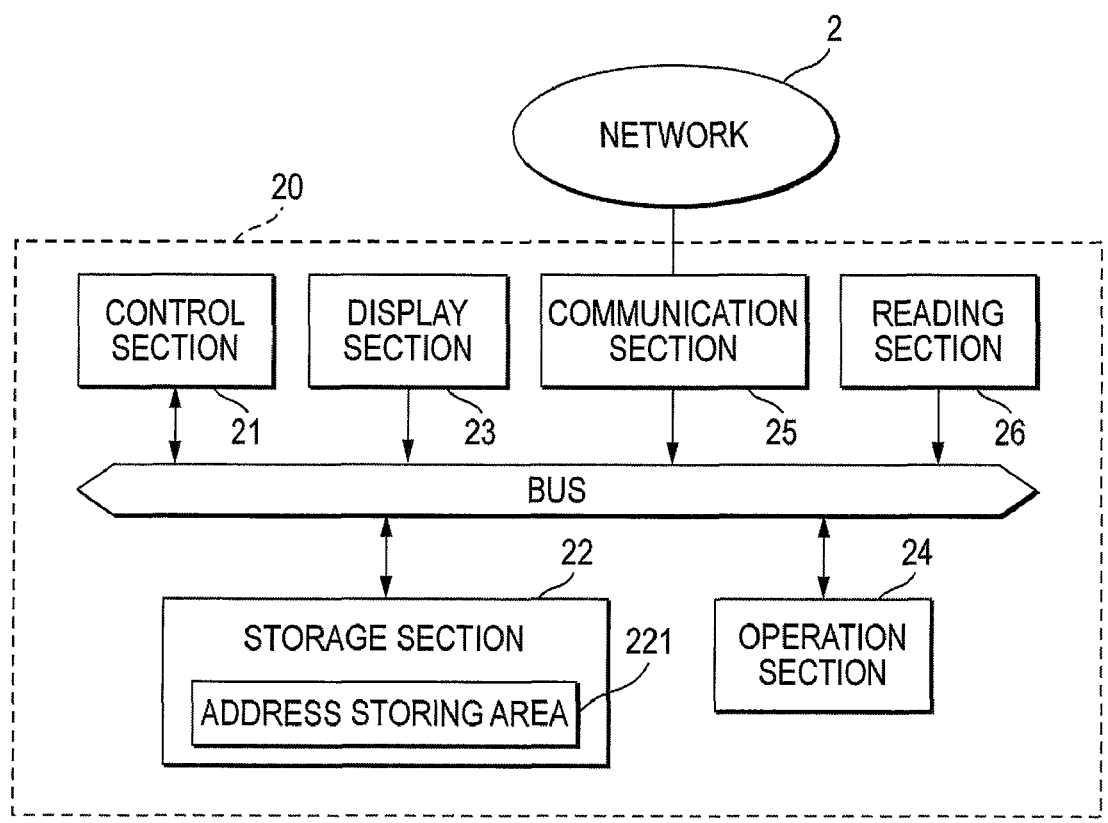
FIG. 2 is a block diagram showing the configuration of each audio reproducing apparatus 20.

FIG. 2 is a block diagram showing the configuration of the audio reproducing apparatus 20. The audio reproducing apparatus 20 is an apparatus having a function of reproducing an audio signal by reading it from a recording medium such as a CD (compact disc) and outputting it to each speaker device 10 and also a function of managing audio reproduction. The audio reproducing apparatus 20 also has a function of receiving an audio signal over the network 2 and reproducing the received audio signal by outputting it to each speaker device 10.

In this embodiment, the audio reproducing apparatus 20 is connected to the network 2 and has the function of reproducing an audio signal received over the network 2. Alternatively, the system may be configured in such a manner that the audio reproducing apparatus 20 is not connected to the network 2. In this case, the audio reproducing apparatus 20 does not receive an audio signal over the network 2 and merely reproduces an audio signal from a recording medium such as a CD.

Referring to FIG. 2, a control section 21 is equipped with a CPU (central processing unit), a ROM (read-only memory), and a RAM (random access memory) and controls the individual sections of the audio reproducing apparatus 20 via a bus by reading computer programs from the ROM or a storage section 22 and running them. The storage section 22 is a storing section such as a hard disk drive for storing a computer program that is run by the control section 21 and data that are used during that time. A display section 23, which is equipped with a liquid crystal panel or the like, displays a menu picture or the like through which to manipulate the audio reproducing apparatus 20, under the control of the control section 21. An operation section 24 outputs, to the control section 21, a manipulation signal corresponding to a manipulation of a user. A communication section 25, which is a communicating section having a modem, for example, communicates with the server 40 over the network 2 and communicates with the speaker devices 10 via the PLC-dedicated adaptor 30. A reading section 26 is a data reading section for reading an audio signal from a recording medium such as a CD. The control section 21 outputs an audio signal that is read out by the reading section 26 or stored in the storage section 22 to each speaker device 10 via the PLC-dedicated adaptor 30 and thereby reproduces the audio signal. At that time, the PLC-dedicated adaptor 30 converts the audio signal that is output from the audio reproducing apparatus 20 into a signal that complies with the PLC scheme and outputs it to each speaker device 10 via the power line 1.

Addresses of the plural speaker devices 10 are stored in an address storing area 221 of the storage section 22. The control section 21 delivers an audio signal to speaker devices 10 using their addresses stored in the address storing area 221.

Figure 3:
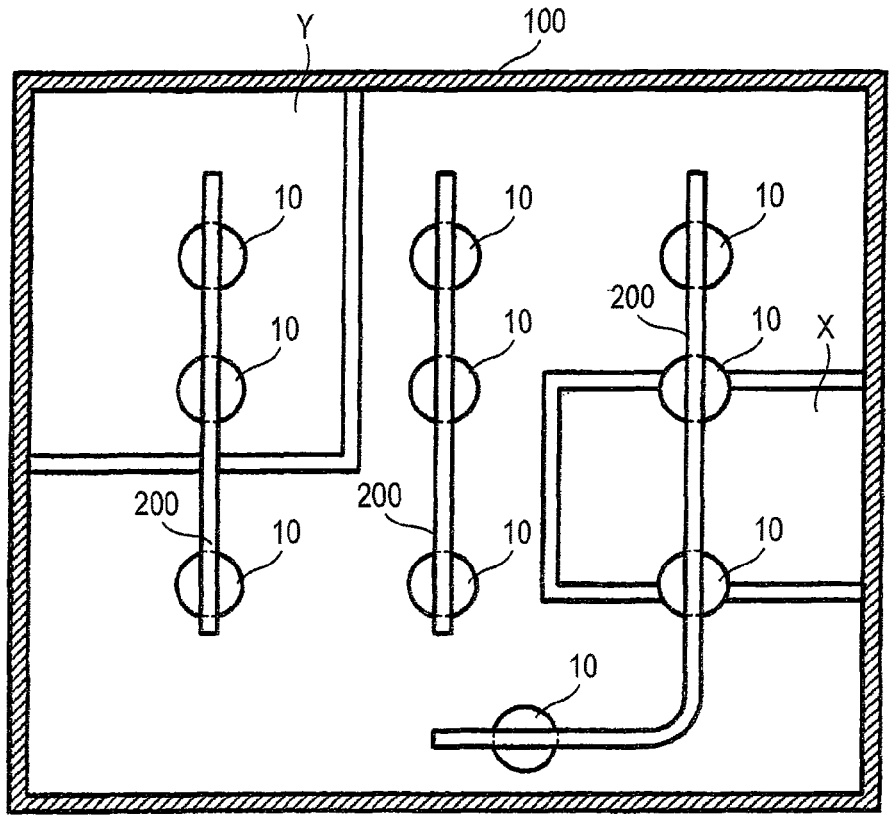
FIG. 3 shows an exemplary installation form of speaker devices 10 in a store 100.

Next, an exemplary installation form of the speaker devices 10 in a store 100 will be described with reference to FIG. 3. As shown in FIG. 3, the store 100 has plural floors such as floor X and floor Y and each floor is equipped with one or plural speaker devices 10. The speaker devices 10 are attached to power supply rails 200 and the individual sections of each speaker device 10 are driven by power that is supplied from the associated power supply rail 200. The speaker devices 10 are assigned respective IP addresses. Each speaker device 10 has a function of receiving an audio signal that is supplied according to the PLC scheme and emits a sound on the basis of an audio signal that is received over the power line 1.

Figure 4:
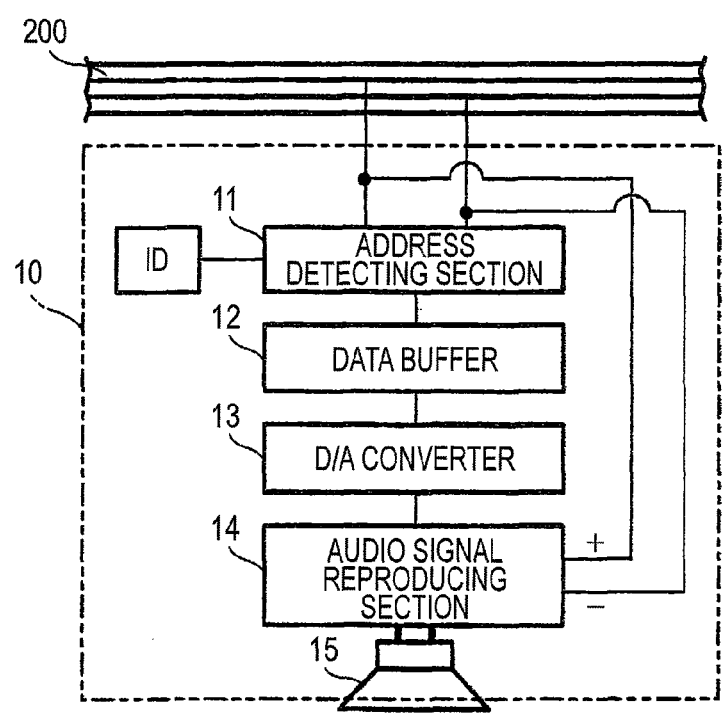
FIG. 4 shows an exemplary configuration of each speaker device 10.

Next, an exemplary configuration of each speaker device 10 will be described with reference to FIG. 4. FIG. 4 is a block diagram showing an exemplary configuration of each speaker device 10. Although the individual sections of the speaker device 10 is supplied with power from the associated power supply rail 200, part of power supply lines are omitted in FIG. 4 to avoid making it unduly complex. Referring to FIG. 4, an address detecting section 11 extracts a power-superimposed signal that is sent over the power line 1 and detects one or plural destination addresses of the extracted signal. A data buffer 12 is a storing section for temporarily storing data that is transmitted over the power line 1. The address detecting section 11 judges whether or not one of the destination addresses of the audio signal transmitted over the power line 1 coincides with an IP address (ID) assigned to the speaker device 10 it belongs to and, if coincidence is found, outputs the data to the data buffer 12. A D/A (digital/analog) converter 13 sequentially reads the digital data from the data buffer 12, converts the digital data into an analog signal, and outputs the analog signal, The data buffer 12 realizes an uninterrupted reproduction function by buffering a transferred audio file or video file. The data buffer 12 also realizes, through buffering, a function of reproducing signals of a simultaneous reproduction content of plural channels (e.g., 5.1 ch or 24 ch) from the speakers 15 simultaneously without delay.

An audio signal reproducing section 14 drives the speaker 15 by amplifying the analog signal that is output from the D/A converter 13 and supplying it to the speaker 15. The speaker 15 is a sound emitting section for emitting a sound according to an analog signal that is supplied from the audio signal reproducing section 14.

In this embodiment, an IP address is used as an ID of each speaker device 10. However, identification information to be used as an ID is not limited to an IP address and may be any information as long as it enables identification of each speaker device 10.

Figure 5:
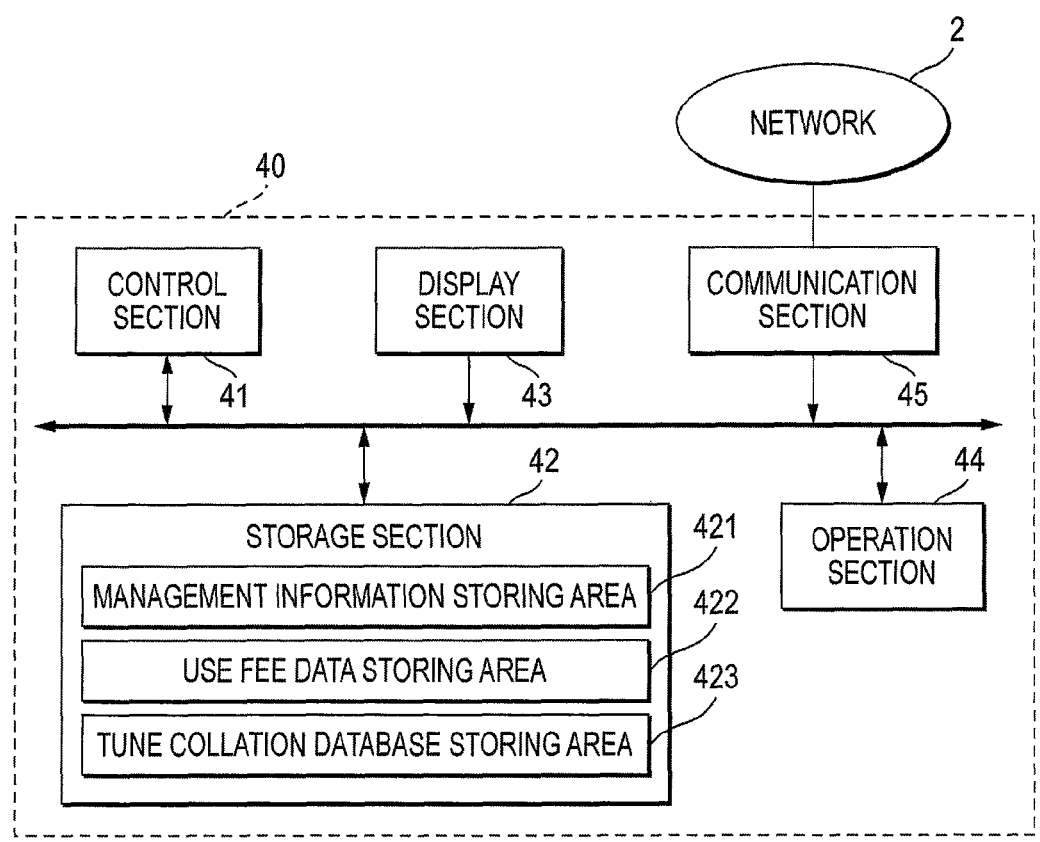
FIG. 5 shows an exemplary configuration of a server 40.

Next, the configuration of the server 40 will be described with reference to FIG. 5. FIG. 5 is a block diagram showing the configuration of the server 40. Referring to FIG. 5, a control section 41 is equipped with a CPU, a ROM, and a RAM and controls the individual sections of the server 40 via a bus by reading computer programs from the ROM or a storage section 42 and running them. The storage section 42 is a storing section such as a hard disk drive for storing a computer program that is run by the control section 41 and data that are used during that time. A display section 43, which is equipped with a liquid crystal panel or the like, displays a menu picture or the like through which to manipulate the server 40, under the control of the control section 41. An operation section 44 outputs, to the control section 41, a manipulation signal corresponding to a manipulation of a user. A communication section 25, which is a communicating section having a modem, for example, communicates with each audio reproducing apparatus 20 over the network 2.

As shown in FIG. 5, the storage section 42 has a management information storing area 421, a use fee data storing area 422, and a tune collation database storing area 423. Management information indicating how tunes were used in the speaker devices 10 is stored in the management information storing area 421.

FIG. 6 shows an example of details of data of management information. As shown in FIG. 6, each piece of management information is stored in such a manner that items "IP address" and "used tunes" are correlated with each other. Identification information such as an IP address for identification of a speaker device 10 is stored as an item "IP address." Tune IDs (pieces of tune identification information) for identification of tunes that were output to the corresponding speaker device 10 are stored as an item "used tunes." The server 40 identifies a tune by performing tune identifying processing (described later) on the basis of an audio signal that is received from the audio reproducing apparatus 20, and stores a tune ID indicating the identified tune in the management information storing area 421 as part of management information that is correlated with the IP address of a speaker device 10 that is a delivery destination of the audio signal.

Use fee data to be used in calculating use fees of tunes are stored in the use fee data storing area 422. FIG. 7 shows an example of details of use fee data. As shown in FIG. 7, each piece of use fee data is stored in such a manner that items "tune ID" and "use fee" are correlated with each other. A tune ID (tune identification information) for identification of a tune is stored as an item "tune ID." Use fee data indicating a use fee of the tune is stored as an item "use fee." In this manner, a corresponding relationship between pieces of identification information of tunes and their use fees are stored in the storing area 422. The control section 41 of the server 40 calculates use fees of tunes that were used in each speaker device 10 on the basis of the management information stored in the management information storing area 421 and the use fee data stored in the use fee data storing area 422.

Collation data to be referred to in identifying a tune represented by an audio signal are stored in the tune collation database storing area 423. The control section 41 analyzes an audio signal received from the audio reproducing apparatus 20, collates an analysis result with the collation data (audio signal analysis results) of the respective tunes that are stored in the tune collation database storing area 423, and identifies a tune represented by the audio signal on the basis of a collation result.

<B. Operation Example>

Next, an operation example of the embodiment will be described. The following operation example corresponds to a case that three tunes a, b, and c are played in order with plural speaker devices 10 that are installed in a store 100 (hereinafter denoted by 100A). Although this operation example is such that the same musical sound is emitted from the plural speaker devices 10, different audio signals may be supplied to plural speaker devices 10. It is also assumed in this operation example that tunes a and b are registered in the use fee data storing area 422 and cause use fees when they are played whereas tune C is an original tune that was composed in the store 100A and hence causes no use fee.

First, an employee of the store 100A manipulates the audio reproducing apparatus 20 to instruct it to reproduce tunes a, b, and C. The operation section 24 of the audio reproducing apparatus 20 outputs a manipulation signal corresponding to the manipulation to the control section 21. On the basis of the manipulation signal that is output from the operation section 24, the control section 21 causes the reading section 26 to read an audio signal of tune a from a CD or the like. The control section 21 outputs the audio signal of tune a (supplied from the reading section 26, to speakers 10 via the PLC-dedicated adaptor 30 using their addresses stored in the address storing area 221. In doing so, in addition to outputting the audio signal of tune a to the speakers 10, the audio reproducing apparatus 20 sends delivery data including the audio signal of tune a and the IP addresses of the destination speaker devices 10 to the server 40 over the network 2.

Next, a description will be made of how each speaker device 10 operates when receiving the audio signal that is delivered from the audio reproducing apparatus 20. The individual sections of the speaker device 10 are driven by power that is supplied from the power supply rail 200. The address detecting section 11 of the speaker device 10 detects the destination addresses of the data that is transmitted via the power supply rail 200, and supplies the data buffer 12 with data whose destination address is the speaker device 10 to which the address detecting section 11 belongs. The speaker device 10 thus receives the audio signal that is supplied from the audio reproducing apparatus 20. The data buffer 12 stores a prescribed amount of data supplied from the audio reproducing apparatus 20 and supplies it to the D/A converter 13. The D/A converter 13 converts the received digital data into an analog signal and supplies it to the audio signal reproducing section 14. The audio signal reproducing section 14 amplifies the received audio signal by a prescribed factor and supplies a resulting signal to the speaker 15. The speaker 15 emits a sound according to the received audio signal. In this manner, the speaker device 10 emits a sound according to the audio signal supplied from the audio reproducing apparatus 20.

Next, a description will be made of how the server 40 operates when receiving the audio signal that is delivered from the audio reproducing apparatus 20. When receiving the delivery data including the audio signal of tune a and the IP addresses of the destination speaker devices 10, the server 40 analyzes the received audio signal, collates an analysis result with the collation data of the respective tunes that are stored in the tune collation database storing area 423, and identifies a tune represented by the audio signal on the basis of a collation result. More specifically, the control section 41 of the server 40 collates data representing a waveform of a head portion (corresponding to a prescribed time, for example, 10 sec) of the received audio signal with data representing waveforms of head portions (corresponding to the prescribed time) of audio signals of the respective tunes that are stored in the tune collation database storing area 423 in advance, and recognizes a tune having coincidence-found data as a tune corresponding to the audio signal. When identifying the tune, the control section 41 stores a tune ID (identification result) in the management information storing area 421 in such a manner that it is correlated with the received IP addresses. If no data in the database is found to coincide with the data of the audio signal, the control section 41 stores information to that effect (hereinafter referred to as an unregistered ID) in the management information storing area 421 in such a manner that is correlated with the received IP addresses.

The audio reproducing apparatus 20 outputs tunes b and C to the speaker devices 10 in the same manner as tune a. The speaker devices 10 thus play tunes a, b, and c in order. The audio reproducing apparatus 20 sends audio signals of tunes b and c to the server 40 in the same manner as the audio signal of tune a. The server 40 identifies tunes on the basis of the received audio signals and stores tune IDs indicating identification results in the management information storing area 421 in such a manner that they are correlated with the IP addresses of the speaker devices 10. In this operation example, the tune IDs of tunes a and b and an unregistered ID are stored in the management information storing area 421 in such a manner that they are correlated with the IP addresses of the speaker devices 10 that are installed in the store 100A.

In this embodiment, the audio reproducing apparatus 20 sends an audio signal of the whole of a tune. Alternatively, the audio reproducing apparatus 20 may send an audio signal of only a head portion (corresponding to 10 sec) of a tune to the server 40.

As described above, in this embodiment, if an employee of a store 100 causes a desired tune to be played using the audio reproducing apparatus 20, an audio signal of the played tune is sent to the server 40 and the server 40 identifies the tune corresponding to the audio signal. The server 40 sequentially accumulates identification results in the management information storing area 421. In this manner, in this embodiment, the server 40 can manage, in a unified manner, what tunes were played with what speaker devices 10.

Next, a description will be made of use fee calculation processing which is performed by the control section 41 of the sever 40. When detecting that it is a predetermined date and time (e.g., the end of a month or a week), the control section 41 of the sever 40 adds up to determine the numbers of times of playing, with each speaker device 10, of tunes and calculates use fees using the management information stored in the management information storing area 421. As for the adding-up for determination of the numbers of times of playing, the control section 41 checks what tunes were played how many times at what IP addresses on the basis of the data stored in the management information storing area 421 and adds up to determine the numbers of times of playing. In calculating use fees, the control section 41 judges whether to calculate a use fee of each tune on the basis of the corresponding relationship stored in the use fee data storing area 422. More specifically, the control section 41 searches the use fee data storing area 422 for tune IDs included in each piece of management information stored in the management information storing area 421 and calculates use fees using use fees corresponding to the thus-found tune IDs. If a tune ID included in a piece of management information is not registered in the use fee data storing area 422, it is not subjected to use fee calculation. The control section 41 does not calculate a use fee either if a tune ID included in a piece of management information is an ID indicating that no corresponding tune ID is registered in the use fee data storing area 422.

The server 40 outputs information of the added-up numbers of times of playing of tunes and use fee information indicating calculated use fees to a predetermined computer apparatus or the like over the network 2, for example. A manager of the computer apparatus can recognize reproduction frequencies (degrees of popularity) and use fees of tunes by checking the information of the added-up numbers of times of playing and the use fee information that are sent from the server 40.

As described above, in this embodiment, when an employee of a store 100 merely causes a desired tune to be played, the audio reproducing apparatus 20 sends an audio signal to the server 40 and the server 40 performs use fee calculation processing. That is, a user of the system is only required to make a manipulation for playing desired tunes and is not required to add up to determine the numbers of times of use of contents or calculate their use fees: the user need not do complicated work. Furthermore, in this embodiment, since a tune is collated by using waveform data itself of an audio signal of the tune, it is possible to collate even a tune whose audio signal is such that its header or the like does not contain a particular code.

<C. Modifications>

Although the embodiment of the invention has been described above, the invention is not limited to the above embodiment and can be practiced in other various forms, examples of which will be described below. The following forms may be combined as appropriate.

(1) In the above embodiment, plural speaker devices 10 are installed in each store 100 and the audio reproducing apparatus 20 outputs an audio signal to speaker devices 10 in each store 100. The audio signal may be reproduced (a musical sound is emitted) either within the closed space of the store 100 or in another place via the network 2 or the like. Even in the case where the audio reproducing apparatus 20 delivers an audio signal over a network, the audio reproducing apparatus 20 may do so using IP addresses that are assigned to the respective speaker devices 10, in the same manner as in the above embodiment.

(2) Although in the above embodiment the server 40 performs tune collation processing, each audio reproducing apparatus 20 may perform tune collation processing. In this case, each audio reproducing apparatus 20 performs tune collation processing on the basis of an audio signal that is output to speaker devices 10. For example, each audio reproducing apparatus 20 may collate a tune by inquiring of the collation database using an audio signal corresponding to a prescribed portion (e.g., a head portion of 10 sec) of the tune. The audio reproducing apparatus 20 sends identification information indicating a collation result and delivery data (data including IP addresses of destination speaker devices 10) to the server 40. The server 40 receives the identification information and the delivery data from the audio reproducing apparatus 20, stores the received identification information and delivery data in the management information storing area 421 and calculates a use fee of the tune on the basis of the identification information and the delivery data.

(3) In the above embodiment, the control section 41 of the server 40 collates a tune by collating a portion of an audio signal received from an audio reproducing apparatus 20 with audio signal portions stored in the tune collation database storing area 423 and retrieves a coincidence-found audio signal portion. However, the tune collation method is not limited to it. For example, it is possible to store the entire waveforms of audio signals in the tune collation database and collate a tune by collating the entire audio signal received from an audio reproducing apparatus 20 with the entire audio signals stored in the tune collation database. It is also possible that data indicating reproduction time lengths of tunes represented by audio signals are stored in the tune collation database in advance and the control section 41 collates the reproduction time length of an audio signal received from an audio reproducing apparatus 20 with the data stored in the tune collation database. Furthermore, it is possible to compress (or convert) audio signals according to a prescribed algorithm and store resulting data in the tune collation database in advance. A tune is collated by compressing (or converting) an audio signal received from an audio reproducing apparatus 20 according to the prescribed algorithm and comparing resulting data with the data stored in the tune collation database.

Figures 8, 9:
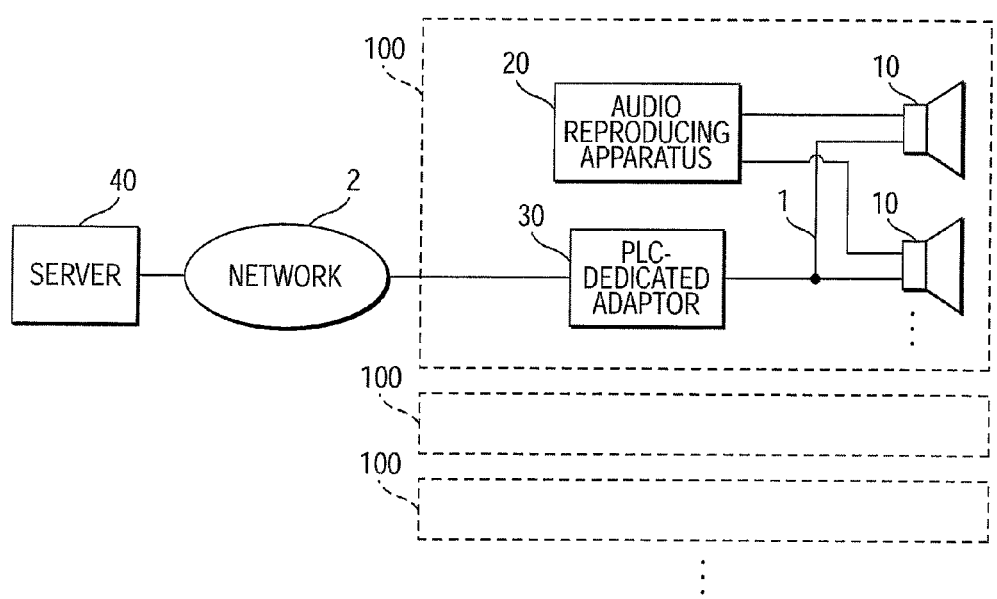
FIG. 8 is a block diagram showing another exemplary system configuration.
FIG. 9 shows an example of details of data stored in an address storing area 221A.

(4) In the above embodiment, each audio reproducing apparatus 20 sends, to the server 40, both of an audio signal that is delivered to speaker devices 10 and identification information (IP addresses) of the speaker devices 10. Alternatively, each speaker device 10 may send, to the server 40, both of an audio signal that is delivered to it and its own identification information. FIG. 8 shows an example of such a configuration. As shown in FIG. 8, speaker devices 10 are connected to a server 40 via power lines 1, a PLC-dedicated adaptor 30, and a network 2. Each audio reproducing apparatus 20 is an apparatus for reading an audio signal from a CD or the like and outputs it to speaker devices 10. Each audio reproducing apparatus 20 has output terminals and the speakers 10 are connected to the output terminals via audio cables (in this case, each speaker device 10 has an audio terminal capable of receiving an audio signal via an audio cable, a composite cable or the like). In this modification, as shown in FIG. 8, only the speaker devices 10 are connected to the server 40 via the network 2 and each audio reproducing apparatus 20 is not connected to the network 2. Each speaker device 10 acquires an audio signal from the audio reproducing apparatus 20 and sends both of the acquired audio signal and identification information (an IP address or the like) stored in itself to the server 40. The server 40 operates in the same manner as described in the above embodiment and will not be described in detail here.

In this modification, each speaker device 10 may be configured so as to perform tune collation processing. In this case, each speaker device 10 is provided with a collating section (e.g., CPU) for performing tune collation processing. For example, the collating section collates a tune by sending a head portion (10 sec) of a received audio signal to the database to make an inquiry and sends, to at least one of the server 40 and the audio reproducing apparatus 20, a collation result and an IP address of the speaker device 10 to which the collating section belongs to.

(5) In the above embodiment, in the case of an audio signal having one or plural channels, an audio reproducing apparatus 20 may deliver audio signals of different channels to respective speaker devices 10. A specific example will be described below. An audio reproducing apparatus (hereinafter denoted by 20A) is different from the audio reproducing apparatus 20 of the above embodiment in the storage contents of the address storing area 221 and the audio signal delivery processing, and is approximately the same as the latter in the other kinds of processing and the other constituent elements. Therefore, the following description will mainly be directed to the points that are different than in the above embodiment and the same kinds of processing and constituent elements will not be described.

As shown in FIG. 9, items "speaker IP address" and "channel type" are stored in an address storing area (hereinafter denoted by 221A) of the audio reproducing apparatus 20A so as to be correlated with each other. An IP address assigned to each speaker device 10 is stored as an item "speaker IP address." Type information indicating a channel type such as a center speaker channel is stored as an item "channel type." A corresponding relationship between addresses assigned to the speaker devices 10 and channel types is stored in this storing area 221A. A manager of each store 100 identifies channels of audio signals to be delivered to respective speaker devices 10 installed in the store 100 and registers the identified channels in the address storing area 221A of the audio reproducing apparatus 20A using a computer or the like.

A control section (hereinafter denoted by 21A) of the audio reproducing apparatus 20A delivers audio signals of corresponding channels to respective speaker devices 10 on the basis of the corresponding relationship between the IP addresses and the channel types which is stored in the address storing area 221A.

Where audio signals are delivered on a channel-by-channel basis in the above manner, the audio reproducing apparatus 20A may operate in such a manner that one or plural speaker devices 10 to which the same tune is to be delivered are regarded as a speaker group, one of the IP addresses of those speaker devices is employed as a representative IP address, and the audio reproducing apparatus 20A sends delivery data including the representative IP address and the audio signals to the server 40. In this case, the control section 41 of the server 40 calculates use fees for each speaker group on the basis of delivery data (representative IP address) received from the audio reproducing apparatus 20A.

It is possible to prepare plural tables with different manners of charging (use fee calculation) and perform charging processing by selecting one from the plural charging systems.

(6) In the above embodiment, the control section 41 of the server 40 may add up to determine the numbers of times of reproduction (delivery) on a tune-by-tune basis (audio-signal-by-audio-signal basis) and output data indicating added-up results. More specifically, for example, it is possible to store audio signals and e-mail addresses of persons who composed the audio signals (tunes) in such a manner that they are correlated with each other and inform those persons of added-up results by sending data indicating the added-up results to them by e-mail. In this case, for example, various kinds of information relating to manners of reproduction such as reproduction places and reproduction times may be sent together with the numbers of times of reproduction. This modification allows each composer of a tune to recognize the number of times of reproduction of the tune and thereby recognize the popularity of the tune which he or she composed.

In this case, the transmission destinations of added-up results may be, for example, persons in charge of BGM of the respective stores 100, charging managers of the respective stores 100, copyright owners, or owners of original disc rights. Where added-up results are sent to copyright owners or owners of original disc rights, the server 40 may send added-up results while distributing them automatically.

(7) Although in the above embodiment an audio signal is transmitted to speaker devices 10 according to the IP protocol, the protocol used is not limited to the IP protocol and may be a dedicated protocol. Any protocol may be used as long as it enables transmission of an audio signal.

In the above embodiment, the storage section 42 of the server 40 is provided with the use fee data storing area 422. Another configuration is possible in which a database for storing use fee data and the server 40 are connected to each other in such a manner that they can communicate with each other and the server 40 registers use fees in the database.

As a further alternative, the server 40 may be provided with a settlement processing section for performing settlement processing on the basis of calculated use fees.

(8) In the above embodiment the server 40 and each audio reproducing apparatus 20 are connected to each other via the network 2 in such a manner that they can communicate with each other. Alternatively, the server 40 and each audio reproducing apparatus 20 may be connected to each other via a power line in such a manner that they can communicate with each other. In this case, each audio reproducing apparatus 20 sends an audio signal to the server 40 over the power line according to the PLC scheme and the server 40 receives the audio signal that is sent from the audio reproducing apparatus 20. That is, the only requirement is that the server 40 and each audio reproducing apparatus 20 be connected to each other in such a manner that they can communicate with each other.

(9) Programs that are run by the control section 21 of each audio reproducing apparatus 20 or the control section 41 of the server 40 can be provided in a state that they are recorded in a recording medium such as a magnetic tape, a magnetic disk, a flexible disk, an optical recording medium, a magneto-optical recording medium, a RAM, or a ROM. It is also possible to download such programs to each audio reproducing apparatus 20 or the sever 40 over a network such as the Internet.

(10) Although the above embodiment is directed to the system in which an audio signal is supplied to speaker devices 10, the invention may be applied to, for example, a system in which image data or moving image data is delivered to display devices. In this case, the system should be such that video reproducing apparatus are provided in place of the audio reproducing apparatus, each video reproducing apparatus supplies image data or moving image data to plural display devices, and the image data or moving image data thus supplied is also sent to a server. The server identifies the received image data or moving image data by collating all or part of it with collation data stored in a collation database, and calculates use fees using identification results. Also in the case where image data or moving image data is to be handled, the server identifies a content by collating all or part of data with the collation data in the same manner as in the above embodiment. This makes it possible to prevent illegal use of contents and to properly deal with copyrights. Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-087408 filed on Mar. 29, 2007, the contents of which are incorporated herein for reference.

What is claimed is:

1. An audio signal delivery management system, comprising:
   a management apparatus; and
   an audio signal delivering apparatus which delivers an audio signal to a plurality of speaker devices to which respective addresses are assigned, the audio signal delivering apparatus being connected to the management apparatus so as to communicate with each other,
   wherein the audio signal delivering apparatus include:
      an address storing portion which stores the addresses of the speaker devices;
      an audio signal acquiring portion which acquires an audio signal;
      an audio signal delivering portion which delivers the audio signal to at least one of the speaker devices using the addresses stored in the address storing portion; and
      an audio signal sending portion which sends the audio signal to the management apparatus; and wherein the management apparatus includes:
      an audio signal receiving portion which receives the audio signal from the audio signal delivering apparatus;
      an audio signal identifying portion which analyzes the audio signal received by the audio signal receiving portion, collates an analysis result of the audio signal with audio signal analysis information of respective tunes which are stored in a storing portion, and identifies a tune represented by the audio signal on the basis of a collation result; and
      an identification information output portion which outputs identification information indicating an identification result of the audio signal identifying portion.

2. An audio signal acquiring and transmitting apparatus, comprising:
   a storing portion which stores terminal identification information;
   an audio signal acquiring portion which acquires an audio signal; and
   a sending portion which sends both of the terminal identification information and the acquired audio signal to an adding-up and management apparatus which adds up to determine the numbers of times of acquisition of tunes in terminals by identifying a tune on the basis of the received audio signal and collecting the terminal identification information and the identified tune.

3. An audio signal identifying and outputting apparatus, comprising:
   a storing portion which stores terminal identification information;
   an audio signal acquiring portion which acquires an audio signal;
   an audio signal identifying portion which analyzes the acquired audio signal, collates an analysis result of the audio signal with audio signal analysis information of respective tunes which are stored in a storing portion, and identifies a tune represented by the audio signal on the basis of a collation result; and
   an identification information output portion which outputs identification information indicating an identification result of the audio signal identifying portion together with the terminal identification information.

4. An audio signal delivering apparatus, comprising:
   a device identification information storing portion which stores identification information for identifying respective speaker devices;
   an audio signal acquiring portion which acquires an audio signal;
   a sending portion which sends both of the device identification information and the acquired audio signal to an adding-up and management apparatus which adds up to determine the numbers of times of acquisition of tunes in the speaker devices by identifying a tune on the basis of the received audio signal and collecting the terminal identification information and the identified tune; and
   an audio signal delivering portion which delivers the audio signal to the speaker devices.

5. The audio signal delivering apparatus according to claim 4, further comprising:
   an adding-up portion which adds up to determine the numbers of times of delivery by the audio signal delivering portion on an audio-signal-by-audio-signal basis; and
   a number-of-times information output portion which outputs number-of-times information indicating the numbers of times determined by the adding-up portion.

6. An audio signal delivering apparatus, comprising:
- a device identification information storing portion which stores device identification information for identifying respective speaker devices;
- an audio signal acquiring portion which acquires an audio signal;
- an audio signal identifying portion which analyzes the acquired audio signal, collates an analysis result of the audio signal with audio signal analysis information of respective tunes which are stored in a storing portion, and identifies a tune represented by the audio signal on the basis of a collation result;
- an identification information output portion which outputs identification information indicating an identification result of the audio signal identifying portion together with the terminal identification information; and
- an audio signal delivering portion which delivers the audio signal acquired by the audio signal acquiring portion to the speaker devices.

7. The audio signal delivering apparatus according to claim 6, further comprising:
- a use fee calculating portion which calculates a use fee of the audio signal on the basis of the identification information indicating the identification result of the audio signal identifying portion; and
- a use fee information output portion which outputs use fee information indicating the use fee calculated by the use fee calculating portion.

8. The audio signal delivering apparatus according to claim 7, further comprising:
- a corresponding relationship storing portion which stores a corresponding relationship between the identification information and use fees of audio signals; and
- a use fee calculation judging portion which judges whether to calculate the use fee of the audio signal delivered by the audio signal delivering portion on the basis of the corresponding relationship stored in the corresponding relationship storing portion,
- wherein the use fee calculating portion calculates the use fee of the audio signal by referring to the corresponding relationship stored in the corresponding relationship storing portion if the use fee calculation judging portion judges that the use fee should be calculated, and does not calculate the use fee if the use fee calculation judging portion judges that the use fee need not be calculated.

9. The audio signal delivering apparatus according to claim 7, further comprising:
- a settlement processing portion which performs settlement processing on the basis of the use fee calculated by the use fee calculating portion.

10. The audio signal delivering apparatus according to claim 7, the use fee calculating portion calculates, on an audio-signal-by-audio-signal basis, use fees of audio signals on the basis of the identification information generated by the audio signal identifying portion.

11. The audio signal delivering apparatus according to claim 7, further comprising:
- a channel type storing portion which stores a corresponding relationship between addresses of the respective speaker devices and types of channels of the audio signal,
- wherein the audio signal acquiring portion acquires the audio signal having one or plural channels;
- wherein the audio signal delivering portion delivers the audio signal having the channel type to the corresponding speaker devices on the basis of the corresponding relationship stored in the channel type storing portion; and
- wherein the use fee calculating portion calculates, on a speaker-group-by-speaker-group basis, the use fees of the audio signals on the basis of the identification information generated by the audio signal identifying portion, speaker devices to which the audio signal having one or plural channels is to be delivered constituting a speaker group.

12. The audio signal delivering apparatus according to claim 6, further comprising:
- an adding-up portion which adds up to determine the numbers of times of delivery by the audio signal delivering portion on an audio-signal-by-audio-signal basis; and
- a number-of-times information output portion which outputs number-of-times information indicating the numbers of times determined by the adding-up portion.

13. The audio signal delivering apparatus according to claim 12, further comprising:
- an address correspondence storing portion which stores identification information for identifying audio signals and addresses of predetermined apparatuses so as to be correlated with each other,
- wherein the number-of-times information output portion sends the number-of-times to the addresses corresponding to the respective audio signals.

* * * * *